United States Patent
Bos et al.

(10) Patent No.: US 12,426,606 B2
(45) Date of Patent: Sep. 30, 2025

(54) JOINT CUTTING APPARATUS

(71) Applicant: Marel Poultry B.V., Av Boxmeer (NL)

(72) Inventors: Jan Willem Bos, Av Boxmeer (NL);
Marinus Petrus Johannes Thijssen, Av Boxmeet (NL); Paul Godefridus Gerardus Arnts, Av Boxmeer (NL); Maurice Eduardus Theodorus Van Esbroeck, Av Boxmeer (NL)

(73) Assignee: Marel Poultry B.V., Av Boxmeer (NL)

( * ) Notice: Subject to any disclaimer, the term of this patent is extended or adjusted under 35 U.S.C. 154(b) by 0 days.

(21) Appl. No.: 19/119,029

(22) PCT Filed: Oct. 9, 2023

(86) PCT No.: PCT/EP2023/077862
§ 371 (c)(1),
(2) Date: Apr. 7, 2025

(87) PCT Pub. No.: WO2024/079029
PCT Pub. Date: Apr. 18, 2024

(65) Prior Publication Data
US 2025/0255316 A1    Aug. 14, 2025

(30) Foreign Application Priority Data
Oct. 14, 2022 (EP) .................................... 22201722

(51) Int. Cl.
*A22C 21/00* (2006.01)
(52) U.S. Cl.
CPC ...... *A22C 21/0023* (2013.01); *A22C 21/0053* (2013.01)
(58) Field of Classification Search
CPC .......... A22C 21/0023; A22C 21/0053
USPC .......................................................... 452/169
See application file for complete search history.

(56) References Cited

U.S. PATENT DOCUMENTS

| | | | |
|---|---|---|---|
| 2,807,046 A * | 9/1957 | Hebenheimer | A22C 21/0023 99/636 |
| 3,522,622 A | 8/1970 | Crane | |
| 7,341,505 B1 | 3/2008 | Gasbarro | |
| 2009/0042497 A1 * | 2/2009 | Sorensen | A22C 21/06 452/117 |

OTHER PUBLICATIONS

International Search Report in corresponding International Application No. PCT/EP2023/077862, dated Jan. 8, 2024 (4 pages).
Written Opinion in corresponding International Application No. PCT/EP2023/077862, dated Jan. 8, 2024 (8 pages).
Extended European Search Report in corresponding European Application No. 22201722.0, dated Mar. 27, 2023 (10 pages).

* cited by examiner

Primary Examiner — Richard T Price, Jr.
(74) Attorney, Agent, or Firm — Osha Bergman Watanabe & Burton LLP

(57) ABSTRACT

A joint cutting apparatus for providing a cut in a wing or leg of a poultry carcass which is being moved in a transport direction by a conveyor is disclosed. The wing includes at least a joint connecting at least a first bone and a second bone and joint tissue surrounding the joint. The joint cutting apparatus comprises a joint guide having a guiding surface configured to engage the poultry carcass at the joint tissue, and a blade arranged configured to make a cut in the joint tissue at a cutting location defined by the joint guide, wherein the guiding surface is elongated and corrugated when seen in the transport direction.

15 Claims, 4 Drawing Sheets

JOINT CUTTING APPARATUS

Figure 1A:
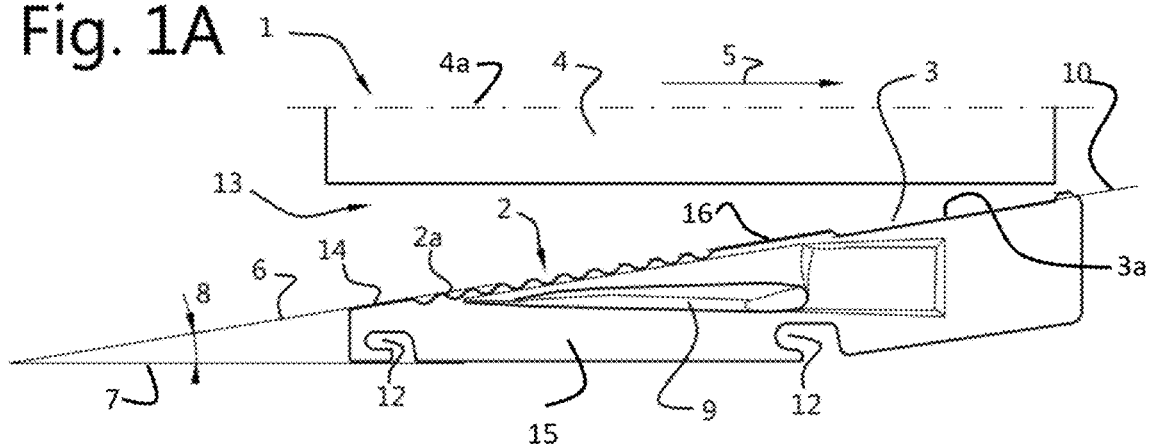

The present invention relates to the field of processing slaughtered poultry carcasses, in particular to providing a cut in a joint connecting a first bone and a second bone, e.g. in a leg or wing of the poultry carcass, e.g. an elbow joint of a poultry wing or in a knee joint of a poultry leg.

After a poultry has been slaughtered, the carcass is usually cut up in at least a few parts that can be sold separately. In some cases wings may be cut off and sold in their entirely, while in other cases the wing is cut into two or more wing parts. The wing consists of the upper arm (also referred to as drumette or the upper-wing segment; comprising the humerus bone), lower arm (also referred to as wingette, flat wing, or the mid-wing segment; comprising the radius and ulna bones), and the wing tip (comprising the metacarpals and phalanges), which are each connected to each other by a joint. To separate e.g. the upper arm and lower arm from each other, a cut is made through the elbow joint (also called second joint), while the lower arm and wing tip are connected by the carpal joint.

The elbow joint thus connects the humerus bone of the upper arm to the radius and ulna bones of the lower arm. The shape of this joint is quite complex and makes it complex to provide an anatomical cut. If the blade making the cut cuts through one of the bones, a part of said bone is after the cutting operation still connected to the other bone via the joint. As a result the part that is cut off can either be too long or too short. In addition, the bone or cartilage is visible at the cut which is visually unappealing.

Several devices have been proposed for making anatomical cuts in poultry wings. However, these devices generally are quite complex and/or do not provide satisfactory cuts.

Similarly, the leg of the poultry can be cut into pieces after slaughtering. The leg comprises the drumstick comprising the femur bone and thigh comprising the tibia bone. The femur bone and tibia bone are connected to each other by the knee joint.

An object of the invention is to overcome or at least partially mitigate the disadvantages of the prior art, or at least provide an alternative. In particular, it is an objective of the invention to provide a solution for making an anatomical cut in the elbow joint of a poultry wing with a device that is relatively simple in construction and use. In particular, it is an objective of the invention to provide a solution for making an anatomical cut in the knee joint of a poultry wing with a device that is relatively simple in construction and use.

One or more objects of the invention can be achieved with a joint cutting apparatus for providing a cut in a poultry carcass, e.g. in a wing or a leg of a poultry carcass, which is being moved in a transport direction by a conveyor, the e.g. the wing or leg, comprising at least a joint connecting at least a first bone and a second bone and joint tissue surrounding the joint,
  wherein the joint cutting apparatus comprises:
    a joint guide having a guiding surface configured to engage the poultry carcass at the joint tissue,
    a blade configured to make a cut in the joint tissue at a cutting location defined by the joint guide,
  wherein
    the guiding surface is elongated and corrugated when seen in the transport direction.

The invention thus relates to a joint cutting apparatus. A cut is made in a poultry carcass that is being moved in a transport direction by a conveyor. The cut is in particular made in a joint connecting a first bone and second bone. As example, it is envisaged that the principles of the invention can be applied to make a cut in the wing of a poultry carcass, e.g. in the elbow joint. It is also envisaged that the principles of the invention can be applied to make a cut in the leg of a poultry carcass, e.g. in the knee joint.

The poultry may e.g. be a chicken, turkey, goose, or duck. The poultry is usually slaughtered priorly, optionally by a slaughtering apparatus arranged in a processing line upstream of the joint cutting apparatus. The poultry carcass can be a carcass part, i.e. having one or more body parts removed priorly. For example, the poultry carcass can be defeathered. Usually the poultry carcass is also already beheaded and eviscerated. When the joint cutting apparatus is configured for providing the cut in the elbow joint, it is possible that the wing tip has already been removed priorly.

Optionally, the poultry carcass comprises two legs. In such cases, the conveyor can be an overhead conveyor comprising a plurality of shackles configured to suspend the poultry carcass by its legs. Optionally, the poultry carcass can be a front halve, e.g. a carcass half comprising at least the breast and the wings. In such cases, the conveyor can be a conveyor configured to transport the front half. Optionally, the poultry carcass can be a separated wing, wherein the conveyor is a wing conveyor. When the cut is made in a leg, the poultry carcass can e.g. be a back halve and the conveyor can be a back halve conveyor, or the poultry carcass can a separated leg and the conveyor can be a leg conveyor. The skilled person knows how to implement each of these types of conveyors.

The conveyor is configured to move the poultry carcass in a transport direction. Optionally, the conveyor is configured to move the poultry carcass in the transport direction while the joint cutting apparatus provides the cut. It is noted, however, that is it is possible that it is possible that the poultry carcass is held stationary while the joint cutting apparatus provides the cut. The transport direction may be a straight direction or a curved direction, e.g. when the joint cutting apparatus is implemented in a carousel machine. The transport direction can e.g. be in a horizontal direction or at an acute angle to the horizontal. Optionally, the conveyor is configured to move the poultry carcass in a processing line comprising a plurality of processing stations, wherein the joint cutting apparatus is arranged at one of the processing stations, e.g. at a wing (part) cutting station or a leg (part) cutting station.

The poultry carcass comprises a wing or leg, which comprises at least one joint. For example, in the case of the wing this can be the elbow joint or carpal joint. In the case of the leg this can e.g. be the knee joint. The joint connects at least a first bone and a second bone. For example, the elbow joint connects the humerus bone (as first bone) to the radius and ulna bone (which can both qualify as second bone). For example, the tarsal joint connects the radius and ulna bone (which can both qualify as first bone) to the metacarpals (as second bones). For example, the knee joint connects the femur bone (which can qualify as first bone) and the tibia bone (which can qualify as second bone). Joint tissue surrounds the joint. The joint tissue may e.g. include skin, membranes, muscles, blood vessels, tendons. Usually there is also first bone tissue surrounding the first bone and second bone tissue surrounding second bone.

The joint cutting apparatus comprises at least a joint guide and a blade. The joint guide has a guiding surface which is elongated and corrugated. Corrugated means that the guiding surface has a plurality of teeth that are arranged alternating with recesses when seen in the transport direction.

Since the guiding surface is elongated, the teeth are arranged on behind the other when seen in a transport direction.

Optionally, the guiding surface has at least five teeth, e.g. at least ten teeth. The joint tissue comes into contact with the guiding surface. The teeth and recesses expose the joint tissue is to alternating increases and decreases of contact pressure. The inventors have found that this causes the joint to be positioned accurately onto the guiding surface. Even if the joint is not positioned accurately when first coming into contact with the guiding surface, the alternating contact pressure will allow the joint to find an accurate position on the guiding surface. This is achieved by partially opening the joint and the joint tissue with the alternating contact pressure.

The teeth and recesses are preferably rounded. This ensures that the joint tissue is not exposed to abrupt increases or decreases of contact pressure. Furthermore, the guiding surface is optionally blunt or dull, i.e. not sharp. Thus, the guiding surface is not a blade or knife making an incision or cut into joint tissue. The blade and the guiding surface are separate components (although optionally arranged on the same guide element). However, it is possible that the guiding surface damages the joint tissue.

The joint guide may e.g. be arranged stationary when seen in the transport direction, and optionally be moveable in a direction perpendicular to the transport direction, wherein e.g. the poultry carcass is being moved passed the blade by the conveyor. The joint guide may be non-rotating.

The joint guide defines a cutting location in the joint tissue. The blade makes a cut into the joint tissue at the cutting location. The cutting location will normally be defined by the location of the joint tissue where the guiding surface engages the joint tissue, either at the most downstream location of the guiding surface or at the moment the blade engages the joint tissue. Since the guiding surface has positioned the wing joint correctly, the cutting location is also defined correctly, and an accurate (anatomical) cut can be made.

The blade may be configured to make a partial cut into the joint. The blade may be configured to cut completely through the joint. The blade may be configured to make an anatomical cut in the joint. The blade may e.g. be a stationary blade, wherein e.g. the poultry carcass is being moved passed the blade by the conveyor. The blade may e.g. be arranged stationary when seen in the transport direction but moveable in a direction perpendicular to the transport direction, wherein e.g. the poultry carcass is being moved passed the blade by the conveyor. The blade may e.g. be configured to be moved into and/or through the joint for making the cut. The blade may e.g. be a rotating blade. The joint cutting apparatus may e.g. comprise a blade drive for moving and/or rotating the blade.

In embodiments, the guiding surface has a longitudinal axis which extends non-parallel to the transport direction. The longitudinal axis extends generally in the direction that the guiding surface is elongated. The longitudinal axis can e.g. be defined by the tops of the teeth of the corrugated surface. Being non-parallel to the transport direction, entails that it is possible that they intersect or are skew lines (i.e. not intersecting because they are offset in a direction perpendicular to both). Optionally the longitudinal axis extends at an acute angle to the transport direction or an imaginary line parallel to the transport direction. Optionally, the longitudinal axis extends non-perpendicular to the transport direction. Optionally, when seen in the transport direction, the longitudinal axis extends partially towards a side of the guiding surface configured to receive the joint tissue.

The longitudinal axis of the guiding surface being non-parallel to the transport directions ensures that, as the poultry carcass is moved in the transport direction, the guiding surface is arranged deeper into the joint tissue. The overall contact pressure is thus increased, despite the alternating increases and decreases of the contact surface. Overall contact pressure can e.g. be considered as an average contact pressure exerted by a pair of subsequent tooth and recess of the corrugated surface. Thus, a first pair of tooth and recess exerts a smaller average contact pressure than a second pair of tooth and recess that is arranged downstream of the first pair.

As the overall contact pressure is increased and the guiding surface is arranged deeper into the joint tissue, the tension in the joint is increased which further opens the joint. The joint being opened entails that the first and second bone are arranged further apart from each other. This provides more space for the blade to make an anatomical cut without hitting the first or second bone.

In embodiments, the joint cutting apparatus further comprises a joint limitation guide arranged opposite of the guiding surface and/or blade, and configured to limit movement of the joint in a direction perpendicular to the transport direction. The joint limitation guide ensures that the joint cannot move away from the guiding surface and/or blade in a direction perpendicular to the transport direction, and thereby ensures that contact is maintained between the guiding surface and/or blade on the one hand, and the joint tissue on the other hand. The joint limitation guide thus ensures that the contact pressure between the guiding surface and the joint tissue is maintained. A gap for receiving the joint tissue is arranged between the guiding surface and/or blade on the one hand, and the joint limitation guide on the other hand.

In embodiments, the guiding surface has a longitudinal axis which extends non-parallel to a longitudinal axis of the joint limitation guide. Thus, the gap between the guiding surface and the joint limitation guide decreases when seen in the transport direction. For example, when the longitudinal axis of the guiding surface extends non-parallel to the transport direction, the longitudinal axis of the joint limitation guide may optionally extend parallel to the transport direction. For example, when the longitudinal axis of the guiding surface extends parallel to the transport direction, the longitudinal axis of the joint limitation guide extends non-parallel to the transport direction.

Since the gap decreases as the poultry carcass is moved in the transport direction, the contact pressure between the joint tissue and the guiding surface increases. This has the same advantages as explained above with reference to the guiding surface having a longitudinal axis which extends non-parallel to the transport direction.

In embodiments, the longitudinal axis of the guiding surface extends at an acute angle to the transport direction or an axis parallel to the transport direction, wherein the acute angle is between 5-25 degrees, preferably 10-15 degrees. In embodiments, the longitudinal axis of the guiding surface extends at an acute angle to the longitudinal axis of the joint limitation guide, wherein the acute angle is between 5-25 degrees, preferably 10-15 degrees. The inventors have found good results of positioning the joint on the guiding surface when the respective angle is in these ranges.

In embodiments, the joint limitation guide comprises a first bone limitation surface and a second bone limitation surface, wherein the first bone limitation surface extends at an angle of the second bone limitation surface, wherein said angle is greater than 0 degrees and smaller than 180 degrees.

For example said angle may be between 20-150 degrees, e.g. between 40-120 degrees. In embodiments, the joint limitation guide further comprises joint limitation surface being curved and defining a recess, wherein the guiding surface and/or the blade is arranged in said recess.

In embodiments, the joint cutting apparatus further comprises a first bone guide configured to engage first bone tissue for moving the first bone relative to the joint; and/or a second bone guide configured to engage second bone tissue for moving the first bone relative to the joint. The first bone tissue is tissue surrounding the first bone, and the second bone tissue is tissue surrounding the second bone. In some embodiments, the joint cutting apparatus may comprise both the first bone guide and the second bone guide. In other embodiments, the joint cutting apparatus may comprise only one of the first bone guide and the second bone guide. In that case, optionally the joint cutting apparatus comprises a bone guide that is configured to engage the tissue of the first and second bone that is the furthest away from the body of the poultry carcass. For example, when the joint cutting apparatus is provided for making a cut in the elbow joint, the bone guide may be configured to guide the lower arm. For example, when the joint cutting apparatus is provided for making a cut in the knee joint, the bone guide may be configured to guide the drumstick.

The first and/or second bone guide moves the first and/or second bone, respectively, relative to the joint. Preferably, said movement is in a direction that opens the joint. Usually this entails that the first and/or second bone, respectively, is moved into a direction where the joint is stretched, e.g. in a direction wherein the first and second bone are arranged more in line with each other. The first and/or second bone guide may e.g. be configured to move the first and/or second bone, respectively, upwards, e.g. when the joint guide is configured to engage the joint tissue below the joint. As the joint is being more opened, this provides more space for the blade to make the cut without hitting the first or second bone.

The first and/or second bone guide may e.g. be embodied as a protrusion extending from the joint guide and/or from a guide element on which the joint guide is arranged. The protrusion may e.g. gradually increase when seen in a transport direction. The protrusion may e.g. at a widest point extend 1-8 mm when seen in a direction perpendicular to the transport direction, preferably 2-6 mm.

In embodiments, the joint cutting apparatus further comprises a pre-cutting blade arranged at the beginning or upstream of the guiding surface and configured to make an incision in the joint tissue. By making this incision, it may be easier for the joint tissue to position itself on the corrugated guiding surface. At the elbow joint of a poultry wing, for example, a skin flap may be present. This skin flap may make it harder for the corrugated guiding surface to contact the joint tissue close enough to the joint to enable the correct positioning of the joint tissue. By providing the incision prior or at the beginning of the guiding surface, the guiding surface can better move the skin flap out of the way and engage the joint tissue closer to the joint. It may also be easier to open the joint. The pre-cutting blade can e.g. be configured to make an incision of 1-5 mm into the joint tissue, e.g. 1-3 mm.

The pre-cutting blade can e.g. be arranged on a guide element on which the joint guide is also arranged. Optionally the joint cutting apparatus further comprises a pre-cut guide for guiding the joint tissue towards the pre-cutting blade. Optionally said pre-cut guide is also arranged on said guide element.

In embodiments, the joint guide and/or the blade are connected to a resilient mechanism for allowing movement of the joint guide and/or blade, respectively. Optionally, the joint cutting apparatus comprises the resilient mechanism. Optionally, when present, the joint limitation guide is arranged stationary (thus not connected to a resilient mechanism). The resilient mechanism may e.g. connect the joint guide and/or blade to a stationary frame. The resilient mechanism can e.g. comprise one or more springs, e.g. mechanical, pneumatic, or hydraulic springs. The movement that is allowed by the resilient mechanism may e.g. be substantially perpendicular to the transport direction.

Optionally, the resilient mechanism may be connected to one of the joint guide and blade, wherein optionally a further resilient mechanism is connected to the other of the joint guide and blade. Optionally, the resilient mechanism may be connected to both the joint guide and blade, e.g. by being connected to a guide element on which both the joint guide and the blade are arranged. Optionally, when further elements such as the pre-cutting blade, pre-cutting guide, and/or first and/or second bone guide are arranged on the same guide element, the resilient mechanism also allows movements of these elements.

Optionally, the resilient mechanism is configured to allow movement in a direction towards or away from the joint limiting guide. Optionally, at least a downstream part of the blade is prevented from moving away from joint limiting guide. This may ensure that the gap between the joint limiting guide and the blade is small enough to cut through the entire joint tissue. For example, the blade can be fixed in position, or a pivot is configured to allow the joint guide and optionally an upstream part of the blade to pivot away from the joint limiting guide while a downstream part of the blade pivots towards the joint limiting guide.

Optionally, the resilient mechanism is configured to allow movement in a direction perpendicular to the transport direction while maintaining the gap between the joint limiting guide and the joint guide and/or blade equal. For example, if the transport direction if horizontal and the joint limiting guide is arranged vertically above the joint guide and/or blade, the movement allowed by the resilient mechanism can be in a horizontal direction perpendicular to the transport direction.

Allowing movement of the joint guide and/or the blade provides the possibility to accommodate for variations in size of the poultry carcass, in particular at the joint tissue. The resilient mechanism is configured to provide a biasing force for biasing the joint guide and/or blade to a resting position in which optionally a joint with small joint tissue can be cut. If the joint tissue is larger, it will automatically move the joint guide and/or blade by providing a force counteracting the biasing force. The movement will provide more space for the larger joint tissue. For example, the gap between the guiding surface and/or blade on the one hand, and the joint limitation guide on the other hand, can be increased by moving the joint guide and/or blade. When the larger joint tissue has been moved passed the joint guide and/or blade, the biasing force may arrange the joint guide and/or blade back to the resting position.

In embodiments, the blade is configured to cut completely through the joint and joint tissue for separating the first bone from the second bone. For example, when the elbow joint is cut through this embodiment allows to separate the lower arm from the upper arm. For example, when the knee joint is cut through this embodiment allows to separate the thigh from the drumstick. Using the joint cutting apparatus according to the invention, a separation of the first and second bone can be achieved with an anatomical cut while using an apparatus that is relatively simple in construction and use.

In embodiments, the blade is arranged downstream of the guiding surface and configured to engage the joint tissue at the same location as the most downstream part of the guiding surface. The guiding surface thus advantageously positions and opens the joint with the corrugated surface, and the blade consequently cuts into the part of the joint tissue that is engaging the guiding surface at the end of the corrugation. The cutting location is as such accurately defined. Optionally, the blade may be arranged adjoining to the guiding surface. Optionally, an intermediate guide is arranged between the guiding surface and the blade, e.g. adjoined on its upstream side by the guiding surface and on its downstream side by the blade. The intermediate guide may e.g. have a constant (i.e. non-corrugated) intermediate surface, optionally having a longitudinal axis parallel to the longitudinal axis of the guiding surface.

In embodiments, the blade comprises a cutting surface having a longitudinal axis which extends non-parallel to the transport direction and/or non-parallel to the longitudinal axis of the joint limiting guide. Optionally, when seen in the transport direction, the longitudinal axis of the cutting surface extends partially towards a side of the cutting surface configured to engage the joint tissue. Optionally, when seen in the transport direction, a gap between the cutting surface and the joint limitation guide decreases. Optionally, the longitudinal axis of the cutting surface extends parallel to the longitudinal axis of the guiding surface. Optionally, the longitudinal axis of the guiding surface coincides with the longitudinal axis of the cutting surface.

As the poultry carcass is moved in the transport direction, the blade will thus penetrate further into the joint tissue and the joint, to make a deep cut. Optionally, the cut is achieved by moving the poultry carcass while keeping the blade generally stationary; however, in some embodiments a resilient mechanism may allow some movement of the blade, but the blade is e.g. not rotating.

In embodiments, the joint cutting apparatus further comprises a downstream blade arranged downstream of the blade, and configured to cut through the final joint tissue. As such, it can be ensured that the first bone is completely separated from the second bone. The downstream blade can e.g. be embodied as a hook. The downstream blade can e.g. be arranged on the guide element.

In embodiments, the guiding surface is configured to engage the joint tissue vertically below the joint. Thus, the joint tissue is (at least partly) supported by the guiding surface. This has the advantage that gravity enhances the contact pressure between the guiding surface and the joint tissue, which improves the positioning and opening of the joint.

In embodiments, the guiding surface is blunt. In other words, the guiding surface is dull, i.e. not sharp. Thus, the guiding surface is not a blade or knife. The guiding surface does not make an incision or cut into joint tissue. The blade and the guiding surface are separate components (although optionally arranged on the same guide element).

In embodiments, the joint cutting apparatus comprises at least one carcass positioning guide arranged upstream of the guide element and optionally upstream of the pre-cutting blade, wherein the carcass positioning guide is configured to engage the poultry carcass for tilting the poultry carcass from a substantially vertical position to an at least partially horizontal position. This may make easier to position the wing or leg on the guiding surface.

For example, if the conveyor is an overhead conveyor having shackles configured to suspend the poultry carcass by the legs, the poultry carcass may be arranged substantially vertical position. The carcass positioning guide may engage the poultry carcass, exerting a friction force which causes the engaged part to trail as the shackle is being moved in the transport direction. The carcass positioning guide may extend partially upwards, to guide the engaged part to a higher position for arranging the poultry carcass in the at least partially horizontal position. For example, if conveyor is configured to move the poultry carcass breast first, the carcass position guide may be configured to position the poultry carcass breast down, optionally by engaging the breast. For example, if conveyor is configured to move the poultry carcass back first, the carcass position guide may be configured to position the poultry carcass back down, optionally by engaging the back.

In embodiments, the joint cutting apparatus further comprises a collector for receiving a separated carcass part comprising one of the first or second bone, and configured to receive quality information regarding the separated carcass part, and configured to classify the separated carcass part based on quality information.

The collector may e.g. comprise a receptacle arranged below the joint cutting apparatus. The collector may e.g. comprise a conveyor belt arranged below the joint cutting apparatus. The collector may e.g. comprise a control unit having a communication terminal for receiving the quality information. The quality information may e.g. be provided by a quality assessment station. The quality assessment station may e.g. be arranged in the processing line, optionally upstream of the joint cutting apparatus. The quality assessment station may be configured to assess one or more quality parameters of the poultry carcass, such as meat quality, meat quantity, meat size, illness. The quality parameters can e.g. be assessed using a visual sensor or a weight sensor, or can be assessed by an operator.

Based on the received quality information, the collector (e.g. the control unit) classifies the separated carcass part. For example, said classification may entail two or more classes, e.g. ranging from high quality to low quality or rejected. Based on the qualification, the collector may determine a subsequent action to be performed on the separated carcass part. Said next action may e.g. entail where the separated carcass part is to be conveyed to. The collector may e.g., based on the classification, convey the separated carcass part accordingly and/or provide a (e.g. visual) output for informing an operator accordingly.

In embodiments, the joint cutting apparatus comprises a guide element, wherein at least the joint guide is arranged on the guide element. Optionally also the blade is arranged on the guide element. Optionally also the first bone guide and/or the second bone guide is arranged on the guide element. Optionally also the pre-cutting blade is arranged on the guide element. Optionally the resilient mechanism is connected to the guide element. Optionally the downstream blade is arranged on the guide element. These embodiments provide multiple features on a single guide element, wherein the guide element is a single physical component and said features are immovable attached to the guide element. Thus, said features are provided as a single module, which makes the joint cutting apparatus simple in construction and use.

In embodiments, the joint cutting apparatus comprises the conveyor configured to move the poultry carcass in the transport direction. The conveyor can e.g. be an overhead conveyor comprising a plurality of shackles configured to suspend the poultry carcass by its legs. The conveyor can e.g. be a conveyor configured to transport a front halve. The conveyor can e.g. be a wing conveyor. The conveyor can e.g. be conveyor configured to transport a back halve. The conveyor can e.g. be a leg conveyor. The skilled person knows how to implement each of these types of conveyors. Optionally, the conveyor is configured to move the poultry carcass in the transport direction while the joint cutting apparatus provides the cut. The transport direction may be a straight direction or a curved direction. The transport direction can e.g. be in a horizontal direction of at an acute angle to the horizontal. Optionally, the conveyor is configured to move the poultry carcass in a processing line comprising a plurality of processing stations, wherein the joint cutting apparatus is arranged at one of the processing stations, e.g. at a wing (part) cutting station.

The invention further relates to a joint cutting station, comprises a first joint cutting apparatus according to any of the embodiments described herein and a second joint cutting apparatus according to any of the embodiments described herein. For example, the first joint cutting apparatus is configured to make a first cut in a joint of a left wing of the poultry carcass, and the second joint cutting apparatus is configured to make a second cut in a joint of a right wing of the poultry carcass. For example, the first joint cutting apparatus is configured to make a first cut in a joint of a left leg of the poultry carcass, and the second joint cutting apparatus is configured to make a second cut in a joint of a right leg of the poultry carcass. Optionally, the first and second cut are made simultaneously. Optionally, the first and second cut are made sequentially, e.g. wherein the first joint cutting apparatus is arranged upstream or downstream of the second joint cutting apparatus.

The invention further relates to one or more methods. Although the methods can be performed with the apparatus according to the invention; neither the apparatus, nor the methods are limited thereto. Features explained herein with reference to the apparatus have the same meaning with respect to the methods unless explicitly defined otherwise. Features explained with reference to the apparatus can be applied mutatis mutandis to the methods to achieve the similar advantages.

The object of the invention can e.g. be achieved with a method for making a cut in a poultry carcass, e.g. a wing or a leg of a poultry carcass, the poultry carcass comprising at least a joint connecting a first bone and a second bone and joint tissue surrounding the joint. The method comprising the following steps: moving the poultry carcass in a transport direction; making the cut using a joint cutting apparatus according to any of the embodiments described herein.

Figure 1B:
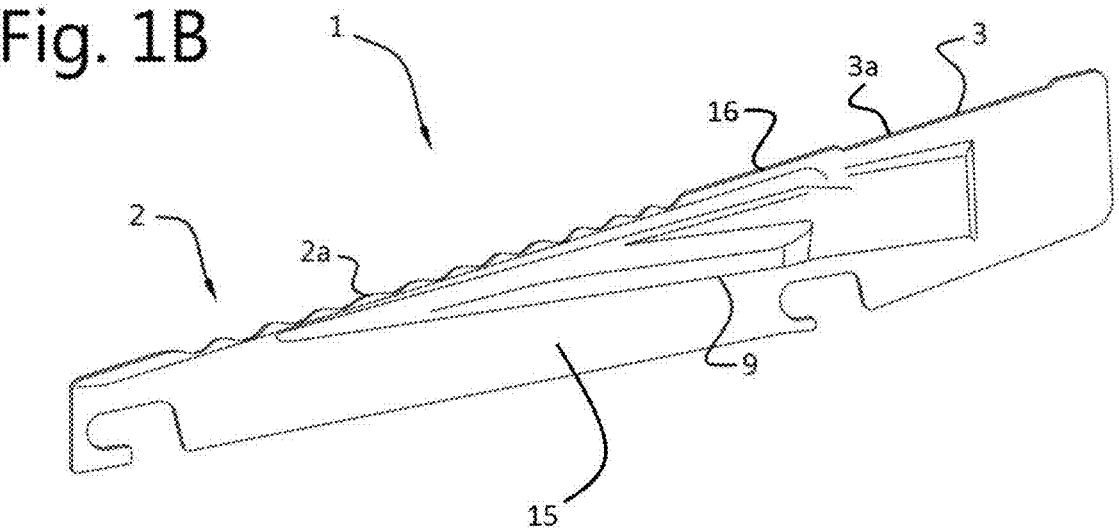
Figure 1C:
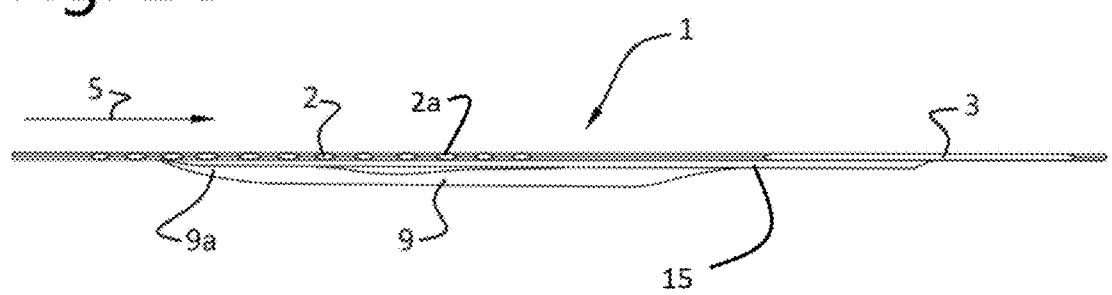
Figure 2A:
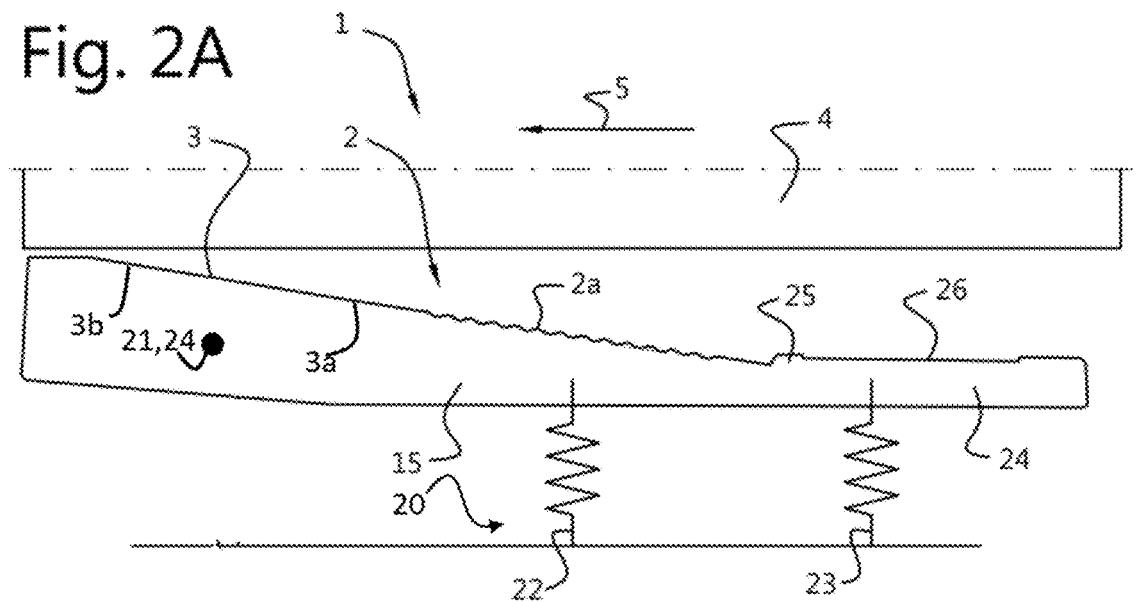
Figure 2B:
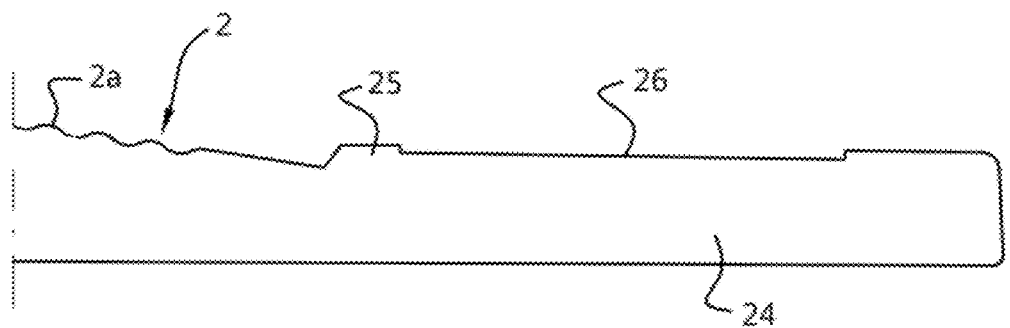
Figure 3A:
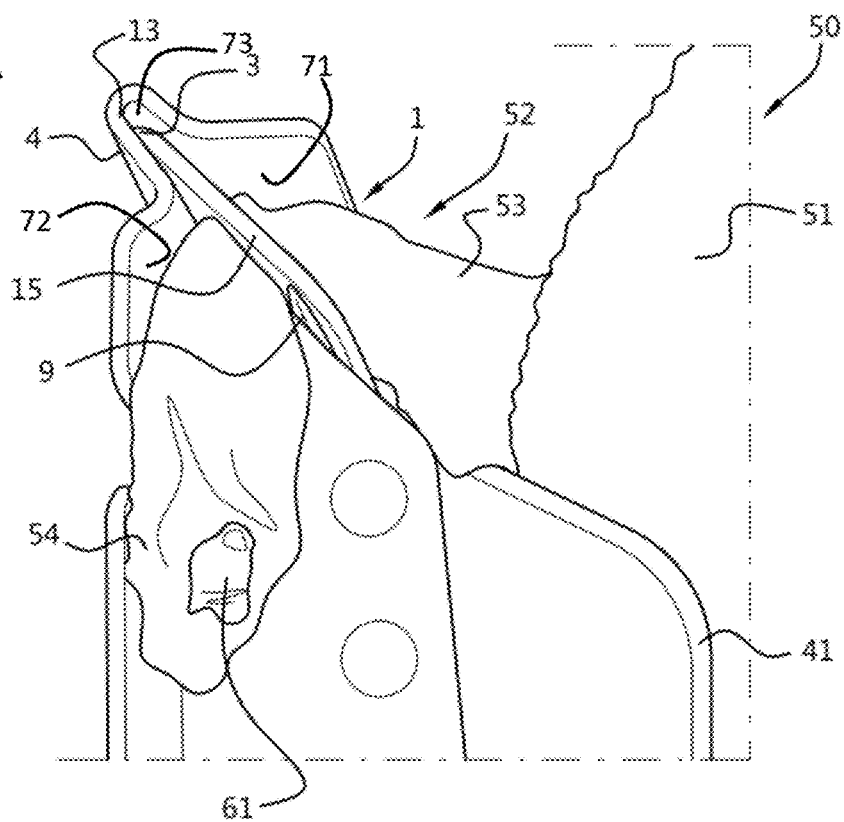
Figure 3B:
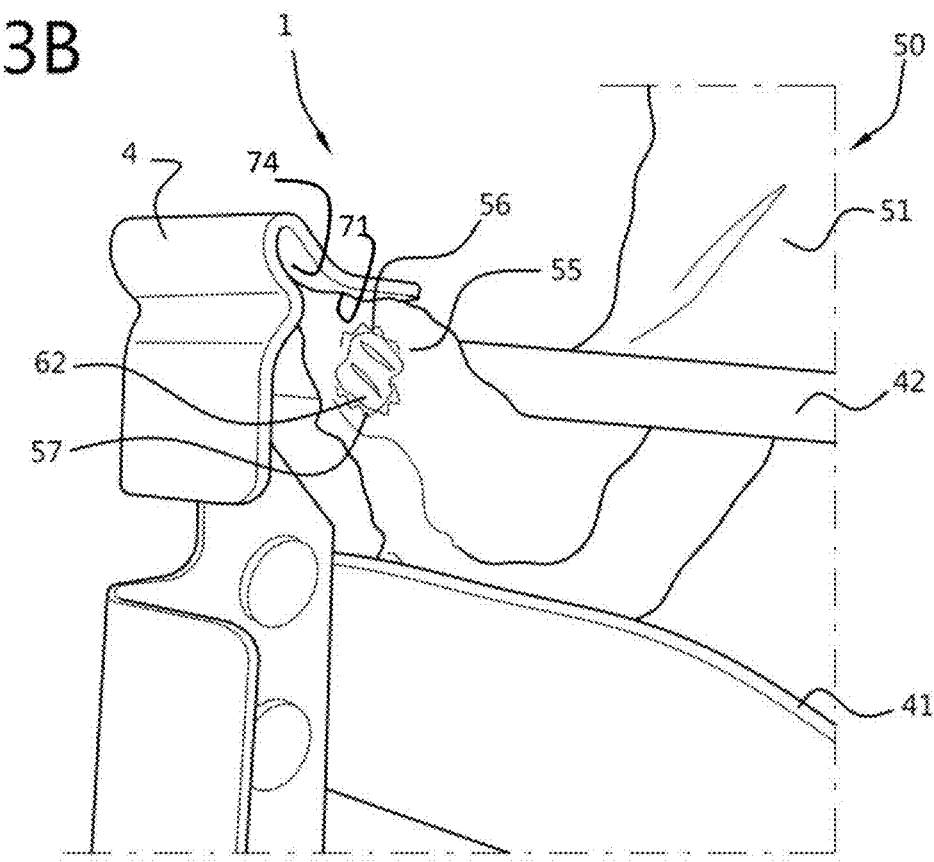
Figure 4:
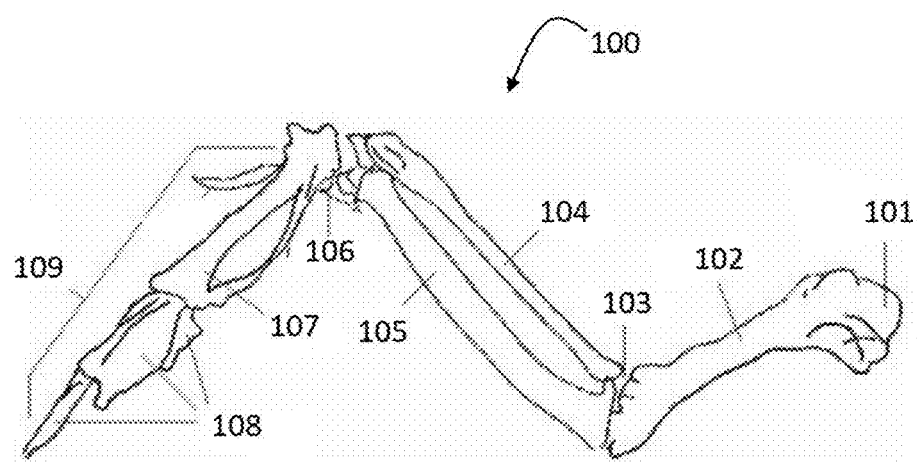

Exemplary embodiments of the invention are described using the figures. It is to be understood that these figures merely serve as example of how the invention can be implemented, and are in no way intended to be construed as limiting for the scope of the invention and the claims. Like features are indicated by like reference numerals along the figures. In the figures:

FIG. 1A: schematically illustrates a joint cutting apparatus in side view;

FIG. 1B: schematic illustrates the joint cutting apparatus in another view;

FIG. 1C: schematically illustrates the joint cutting apparatus in top view;

FIG. 2A: schematically illustrates a joint cutting apparatus having additional optional features;

FIG. 2B: shows an enlarged portion of the joint cutting apparatus shown in FIG. 2A;

FIG. 3A-3B: schematically illustrate an implementation of a joint cutting apparatus for cutting of a wing part of a poultry carcass FIG. 4: illustrates the anatomy of a poultry wing.

To enhance the understanding of a possible application of the present invention, FIG. 4 illustrates the anatomy of a poultry wing 100. It is noted, however, that the invention can also be applied to make a cut in other joints, e.g. in a poultry leg, e.g. in the knee joint.

FIG. 4 illustrates the bones and joints that are present, but it will be understood that in practice tissue is surrounding all of what is shown in FIG. 4. Such tissue includes skin, cartilage, membranes, muscles, blood vessels, tendons.

The poultry wing 100 comprises a shoulder joint 101, via which the poultry wing 100 is connected to the body of the poultry carcass. The humerus bone 102 extends from the shoulder joint 101. Together with the tissue surrounding it, the humerus bone 102 forms the upper arm. The elbow joint 103 connects the upper arm to the lower arm. The lower arm comprises the radius bone 104 and the ulna bone 105. The carpal joint 106 connects the lower arm to the wing tip 109. The wing tip comprises metacarpals 107 and phalanges 108.

The invention relates to a joint cutting apparatus which can make a cut in a joint connecting a first bone and a second bone. For example, the cut can be made in the elbow joint 103, wherein the first bone is the humerus bone 102. The radius bone 104 and the ulna bone 105 can both constitute the second bone.

FIG. 1A schematically illustrates a joint cutting apparatus 1 in an embodiment according to the invention. The joint cutting apparatus 1 comprising a joint guide 2, a blade 3 and a joint limitation guide 4. The joint guide 2 and blade 3 are arranged on a guide element 15, which is also illustrated in FIG. 1B and in top view FIG. 1C. The joint cutting apparatus 1 is intended to be used for making a cut in a poultry carcass, e.g. in the elbow joint of a wing of a slaughtered poultry such as chicken; or in a leg of a slaughtered poultry, e.g. in the knee joint.

The poultry carcass is transported in a transport direction 5 by a conveyor (not shown). Such conveyors are generally known; for example, for poultry an overhead conveyor can be used which comprises a plurality of shackles, each shackle transporting a poultry carcass suspended by its legs. In FIG. 1A, the transport direction 5 is from left to right and is parallel to the horizontal. A gap 13 can be defined between the joint guide 2 and the joint limitation guide 4, into which the joint of the poultry carcass is entered.

The joint of the poultry carcass and the joint guide 2 are positioned relative to each other in such a way that joint tissue surrounding the joint comes into contact with the joint guide 2. The first bone and second bone are arranged on opposite sides of the joint guide 2. For example, the first bone may be arranged what in the view of FIG. 1A is behind the joint guide 2 and the second bone in front of the joint guide 2. If needed, the poultry carcass (in particular the joint, the first bone, and/or the second bone) can be guided towards the joint cutting apparatus 1 by pre-guiding means (not shown). Said pre-guiding means can e.g. include one or more converging guide elements that have a wide opening for receiving a to-be-guided part of the poultry carcass, and converge to guide said part towards the desired position while approaching the joint cutting apparatus 1. The pre-guiding means can also comprise a carcass positioning guide configured to arrange the poultry carcass from a substantially vertical position into an at least partially horizontal position.

When entering the gap 13, the joint tissue may first come into contact with an optional receiving member 14, and then with a guiding surface 2a of the joint guide 2. In embodiments, the receiving member 14 can be omitted such that the joint immediately comes into contact with the guiding surface 2a of the joint guide 2. It can be seen that guiding surface 2a is corrugated and elongated. That is, the guiding surface 2 comprises a plurality of protrusions and recesses, alternating when seen in the transport direction 5. In this example, the protrusions are rounded teeth. In this example, eleven rounded teeth are provided, but this number may be adapted, e.g. based on the type of poultry carcass or joint to be guided. Optionally, the protrusions are blunt (and rounded), such that they do not make an incision or cut into the joint tissue. In some embodiments, however, it is also possible that that the guiding surface damages the joint tissue slightly during the positioning. In addition, the guiding surface is elongated, as can e.g. be seen in FIG. 1C, where it is visible that the guiding surface in much larger in (in this view) the direction from left side of the page to the right side than in the direction from the bottom of the page to the top.

While the poultry carcass is being transported in the transport direction 5, the joint tissue is exposed to alternating increases and decreases of contact pressure, due to the corrugated guiding surface 2a. This causes the joint to be positioned onto the guiding surface and gradually open. The blade 3 is arranged downstream of the guiding surface 2a, and can thus make the cut when the joint is opened. This allows to make a clean cut between the first and second bone. The cut is made in a cutting location defined by the guiding surface, thereby reducing or even eliminating the possibility that the blade 3 hits the first or second bone while making the cut. An anatomical cut can thus be made.

FIG. 1A illustrates a longitudinal axis 6 of the contact surface 2a. The longitudinal axis 6 is in this example defined by the tops of the teeth of the corrugated surface 2a. The longitudinal axis 6 extends non-parallel to the transport direction 5. In FIG. 1A, this is illustrated with help of a horizontal axis 7 which is parallel to the transport direction 5. As can be seen, the longitudinal axis 6 extends at an angle 8 of the horizontal axis 7. As a consequence, the contact pressure exerted onto the joint tissue by the guiding surface 2a increases as the poultry carcass is moved in the transport direction 5. At the same time, the contact pressure still has alternating increases and decreases because of the corrugated surface. Thus for example, an average contact pressure exerted on the joint tissue by a first pair of tooth and recess is smaller than the average contact pressure exerted on the joint tissue by a second pair of tooth and recess, if the second pair is downstream of the first pair. This further opens the joint, and hence improves the cut. The angle 8 may e.g. be 10-15 degrees.

The joint limiting guide 4 is configured to engage the joint tissue at the opposite side of the joint when compared to the joint guide 2. FIG. 1A further illustrates that (a longitudinal axis 4a of) the joint limiting guide 4 extends parallel to the transport direction 5. Thus, the longitudinal axis of the guiding surface 2a extends non-parallel to the joint limiting guide 4 and the gap 13 becomes smaller when seen in the transport direction. This ensures that the joint tissue cannot move upwards (in the example of FIG. 1A) as the contact pressure is increased by the joint guide 2. The joint limiting guide 4 can e.g. embodied as a guide bar or guide plate having a suitable shape (see e.g. FIGS. 3A-3B). In other embodiments, it could be possible that longitudinal axis 6 of the guiding surface 2a extends parallel to the transport direction 5, but the longitudinal axis 4a of the joint limitation guide 4 extends non-parallel to the transport direction 5. It is also possible for both the longitudinal axis 6 of the guiding surface 2a and the longitudinal axis 4a of the joint limitation guide 4 to extend non-parallel to the transport direction 5 and to each other.

In the shown example, the joint remains in contact with the guide element 15 between the guiding surface 2a and the blade 3. This allows the blade 3 to make the cut in the location of the joint tissue that was in contact with the guiding surface 2a at the most downstream location of the guiding surface 2a. The cutting location is thereby defined, and the cut can be made through the opened joint without hitting the first or second bone. In the shown embodiment the joint cutting apparatus 1 comprises an intermediate guide 16 between guiding surface 2a and the blade 3, but in other embodiments it is possible for the guiding surface 2a and the blade 3 to be adjoining.

The blade 10 has a cutting surface 3a that is sharp, and is configured to make the cut. FIG. 1A further shows a longitudinal axis 10 of the cutting surface 3a, which also extends non-parallel to the transport direction 5. In this example the longitudinal axis 10 of the blade 3 extends parallel to the longitudinal axis 6 of the guiding surface 2a, but it is also possible that the respective longitudinal axes 6, 10 extend at different angles to the horizontal 8. As the gap 13 between the blade 3 and the joint limiting guide 4 becomes smaller than the thickness of the joint tissue, the blade 3 starts cutting into the joint tissue and through the joint. In the shown example the blade 3 extends at the angle 8 until it is so close to the joint limiting guide 4 that the joint is completely cut through. The first bone and second bone are then separated from each other.

Although not illustrated in FIG. 1A, it is also possible to provide a downstream blade downstream of the blade 3. The downstream blade can e.g. be embodied as a hook, which makes sure to cut through the final joint tissue, in case the blade 3 did not completely cut through the joint tissue.

FIG. 1A-1C further illustrates that the joint cutting apparatus 1 may comprise a second bone guide 9, which is configured to engage the second bone. In this example, the second bone guide 9 extends as a protrusion from the guide element 15 and has a widening part 9a (see FIG. 1C) at its most upstream part. The second bone guide 9 gradually becomes thicker. The second bone guide 9 moves the second bone relative to the joint by pushing it wider and higher, which further opens the joint.

The joint cutting apparatus 1 in the shown example does not have a guide for the first bone that is similar to the second bone guide 9, as can best be seen in FIG. 1C. This may e.g. be the case because the poultry carcass is generally being conveyed by the conveyor at a location which in the view of FIG. 1A is behind the joint cutting apparatus 1. The second bone is thus part of the poultry carcass being arranged most offset from the poultry carcass. The first bone may partially be suspended by the poultry carcass, while the second bone is hanging down over the joint guide 2. If, on the other hand, the poultry carcass is suspended above the joint cutting apparatus 1 such that both the first and second bone are hanging down on opposite guides of the joint guide 2, it may be advantageous to provide a first bone guide as well, embodied similar to the second bone guide 9.

It will be understood that in practice the joint cutting apparatus 1 is connected to a frame of similar, to be at the correct height relative to the conveyor. Connector elements 12 are provided for connecting the joint apparatus 1 to the frame.

FIG. 2A-2B schematically illustrates an embodiment having a few optional features that can be provided in addition. The joint cutting apparatus 1 comprises for example a pre-cutting blade 25, which is shown enlarged in FIG. 2B. The pre-cutting blade 25 is arranged upstream of the joint guide 2 and makes an incision in the joint tissue. This incision may make the joint tissue more flexible, which allows the guiding surface 2a to more efficiently open and more accurately position the joint. This may in particular be advantageous when the joint is the elbow joint of a poultry wing, where a so-called skin flap may be present. This skin flap, together with the joint tissue, may influence the positioning and opening of the joint by the guiding surface 2a.

In the shown example, the joint cutting apparatus 1 comprises a pre-cut guide 26 upstream of the pre-cut blade 25. The pre-cut guide 26 engages the joint tissue as the poultry carcass is conveyed towards the pre-cut blade 25. The pre-cut blade 25 extends a few milometers (e.g. 1-3 mm) from the pre-cut guide 26, such that the incision is made when the joint tissue is moved past the pre-cut blade 25. A practical implementation entails a pre-cut extension 24 that is part of the guide element 15. The pre-cut guide 26 and pre-cut blade 25 are formed by and/or arranged on the pre-cut extension 24. Many other implementations are, however, possible.

Another advantageous option entails that the guide element 15 is connected to the frame 31 by a resilient mechanism 20 having springs 22, 23. The springs 22, 23 allow some movement of the guide element 15 against a biasing force, in a direction perpendicular to the transport direction 5. In this example this is a downwards movements against an upwards biasing force. Said movement allows to accommodate for varying sizes of the joint tissue. The joint limiting guide 4 is stationary and thus remains in the same position regardless of the size of the joint tissue. The joint limiting guide 4 may extend opposite of the pre-cut blade 25 and pre-cut guide 26.

FIG. 2A illustrates that a pivot 21 may further be part of the resilient mechanism. The pivot 21 defines a pivot axis 24 which extends in a direction perpendicular to the paper in the shown view. The movement allowed by the resilient mechanism 20 is a pivoting movement about the pivot axis 24. This entails that e.g. when the joint guide 2 and an upstream part 3a of the blade 3 move downwards, a downstream part 3b of the blade 3 moves upwards. This ensures that gap between the blade 3 and the joint limiting guide 4 is small enough at the downstream part 3b to cut through the joint tissue. In other embodiments the pivot can be arranged further upstream such that e.g. when the joint guide 2 moves downwards the entire blade 2 moves upwards.

Other mechanisms are possible for providing the biasing force. For example, if the biasing force is downwards (e.g. on the joint limiting guide 4), gravity may be used, optionally by providing additional weights. It is also possible to use other resilient mechanisms, e.g. pneumatic or hydraulic components.

It is also possible that the resilient mechanism 20 allows movement in a direction perpendicular to the transport direction 5 while maintaining the gap between the joint limiting guide 4 and the joint guide and/or blade 3 equal. In the view of FIG. 2A this would be a movement in a direction perpendicular to the paper.

Furthermore, since in the shown example the joint guide 2, the blade 3, and the pre-cutting blade 25 are all (rigidly) connected to the guide element 15, they will move together in this example. In other embodiments, it is possible that e.g. the joint guide 2 and blade 3 can be moved separately against a biasing force, or even that one can be moved while the other cannot.

FIGS. 3A and 3B illustrate a possible application of a joint cutting apparatus 1 for cutting an elbow joint of a poultry wing 52. The poultry carcass 50 is a poultry carcass 50 being conveyed by a shackle (not shown) of an overhead conveyor. The poultry carcass 50 is being conveyed breast 51 first. The position may priorly be changed from hanging completely vertical to more horizontal, e.g. using a carcass positioning guide. This may make it easier to position the poultry wing 52 using pre-guiding elements.

In FIG. 3A it is visible that the poultry wing 52 comprises a first cut 61 which has priorly separated the wing tip from the poultry wing 52. The poultry wing 52 still comprises the upper arm 53 and the lower arm 54, which are connected by the elbow joint. The upper arm 53 comprises a first bone (the humerus bone), and the lower arm 54 comprises at least a second bone (in the case of poultry wings 53 an ulna bone and a radius bone are present). Said elbow joint will be cut through by the joint cutting apparatus 1, of which the guide element 15 and the joint limiting guide 4 are visible in FIG. 3A. The guide element 15 is not arranged vertically as in the schematic presentations of FIG. 1A-2B. Although not visible, it will be understood that the guiding surface and the blade are arranged at the same angle as the guide element 15. The longitudinal axis of the guiding surface and the blade still extend non-parallel to the transport direction, which extends horizontally.

The upper arm 52 and the lower arm 53 are arranged on mutually opposite sides of the guide element 15, and thus also of the guiding surface and the blade 3. FIG. 3A illustrates that at the most downstream part of the blade 3, the gap 13 is very small. As the poultry carcass 50 is moved through the joint cutting apparatus 1, the joint is opened and positioned by the guiding surface. Then, the blade 3 starts making the cut in the joint, until the gap 13 is so small that the joint is completely cut through and the lower arm 54 is separated from the upper arm 55.

This situation can be seen in FIG. 3B, which shows a second cut 62. The joint parts 55 that are part of the upper arm 52 are still visible. Also some joint tissue 57 arranged below the joint and some joint tissue 56 arranged above the joint are visible. The lower arm has been cut off, and fallen down. Although not shown, a collector may be arranged below the joint cutting apparatus 1 for receiving the lower arm. The collector is further configured to receive quality information regarding the lower arm from a quality assessment station. Based on the quality information, the collector classifies the lower arm and determines a subsequent action to be performed on the lower arm.

FIGS. 3A and 3B further illustrate a guide plate 41 and a guide bar 42. The guide plate 41 guides the body of the poultry carcass 50 as well as the upper arm 53 by engaging below the shoulder. The guide bar 42 guides the upper arm 53 by holding it down. The guide plate 41 and guide bar 42 may be part of pre-guiding elements which help to position the poultry carcass 50 and the wing 52 such that the joint tissue is arranged in the gap 13 of the joint cutting apparatus 1.

Further visible is an advantageous embodiment of the joint limitation guide 4, having a first bone limitation surface 71, a second bone limitation surface 72, and a joint limitation surface 73. The first 71 and second bone limitation surface 72 extend at an angle of each other. This is adapted to the arrangement of the upper arm 53 and lower arm 54, since the upper arm 53 is arranged partially horizontal while the lower arm 54 is hanging vertically over the guide element 15. The joint limitation surface 73 is arranged in a relatively narrow recess 74. The blade 3 extends into this recess 74, which ensures that the cut is made completely through the joint.

Although FIG. 3A-3B only show a single joint cutting apparatus 1 for one wing 52 of the poultry carcass 50, it will be understood that a second joint cutting apparatus can be provided for the other wing, embodied similar but mirrored. The second joint cutting apparatus can be configured to provide the cut in the second wing simultaneously with the joint cutting apparatus 1 making the cut in the wing 52. It is also possible the second joint cutting apparatus is arranged further upstream or downstream.

As required, detailed embodiments of the present invention are described herein; however, it is to be understood that the disclosed embodiments are merely examples of the invention, which may be embodied in various ways. Therefore, specific structural and functional details disclosed herein are not to be construed as limiting, but merely as a basis for the claims and as a representative basis for teaching those skilled in the art to practice the present invention in various ways in virtually any suitable detailed structure. Not all of the objectives described need be achieved with particular embodiments.

Furthermore, the terms and expressions used herein are not intended to limit the invention, but to provide an understandable description of the invention. The words "a", "an", or "one" used herein mean one or more than one, unless otherwise indicated. The terms "a multiple of", "a plurality" or "several" mean two or more than two. The words "comprise", "include", "contain" and "have" have an open meaning and do not exclude the presence of additional elements. Reference numerals in the claims should not be construed as limiting the invention.

The mere fact that certain technical features are described in different dependent claims still allows the possibility that a combination of these technical measures can be used advantageously.

A single processor or other unit can perform the functions of various components mentioned in the description and claims, e.g. of processing units or control units, or the functionality of a single processing unit or control unit described herein can in practice be distributed over multiple components, optionally physically separated of each other. Any communication between components can be wired or wireless by known methods.

The actions performed by the control unit can be implemented as a program, for example computer program, software application, or the like. The program can be executed using computer readable instructions. The program may include a subroutine, a function, a procedure, an object method, an object implementation, an executable application, a source code, an object code, a shared library/dynamic load library and/or other set of instructions designed for execution on a computer system.

A computer program or computer-readable instructions can be stored and/or distributed on a suitable medium, such as an optical storage medium or a solid-state medium supplied with or as part of other hardware, but can also be distributed in other forms, such as via internet or other wired or wireless telecommunication systems.

The invention claimed is:

1. A joint cutting apparatus for providing a cut in a leg or wing of a poultry carcass which is being moved in a transport direction by a conveyor, the leg or wing comprising at least a joint connecting at least a first bone and a second bone and joint tissue surrounding the joint, wherein the joint cutting apparatus comprises:
   a joint guide having a guiding surface configured to engage the poultry carcass at the joint tissue; and
   a blade configured to make a cut in the joint tissue at a cutting location defined by the joint guide,
wherein the guiding surface is elongated and corrugated when seen in the transport direction.

2. The joint cutting apparatus according to claim 1, wherein the guiding surface has a longitudinal axis which extends non-parallel to the transport direction.

3. The joint cutting apparatus according to claim 1, further comprising a joint limitation guide arranged opposite of the guiding surface and/or blade, and configured to limit movement of the joint in a direction perpendicular to the transport direction, wherein the guiding surface has a longitudinal axis which extends non-parallel to a longitudinal axis of the joint limitation guide.

4. The joint cutting apparatus according to claim 1, further comprising
   a first bone guide configured to engage first bone tissue for moving the first bone relative to the joint; and/or
   a second bone guide configured to engage second bone tissue for moving the first bone relative to the joint.

5. The joint cutting apparatus according to claim 1, further comprising a pre-cutting blade arranged at the beginning or upstream of the guiding surface and configured to make an incision in the joint tissue.

6. The joint cutting apparatus according to claim 1, wherein the joint guide and/or the blade are connected to a resilient mechanism for allowing movement of the joint guide and/or blade, respectively.

7. The joint cutting apparatus according to claim 1, wherein the blade is configured to cut completely through the joint and joint tissue for separating the first bone from the second bone.

8. The joint cutting apparatus according to claim 1, wherein the blade is arranged downstream of the guiding surface and wherein the cutting location is the location at which the most downstream part of the guiding surface engages the joint tissue.

9. The joint cutting apparatus according to claim 1, wherein the blade comprises a cutting surface having a longitudinal axis which extends non-parallel to the transport direction and/or non-parallel to the longitudinal axis of the joint limiting guide, wherein optionally the longitudinal axis of the cutting surface extends parallel to the longitudinal axis of the guiding surface.

10. The joint cutting apparatus according to claim 1, wherein the longitudinal axis of the guiding surface extends at an acute angle to at least one of: the transport direction or an axis parallel to the transport direction; or a longitudinal axis of the joint limitation guide; wherein the acute angle is between 5-25 degrees, preferably 10-15 degrees.

11. The joint cutting apparatus according to claim 1, wherein the guiding surface is configured to engage the joint tissue vertically below the joint.

12. The joint cutting apparatus according to claim 1, wherein the guiding surface is blunt.

13. The joint cutting apparatus according to claim 1, further comprising at least one carcass positioning guide arranged upstream of the guide element and optionally upstream of the pre-cutting blade, wherein the carcass positioning guide is configured to engage the poultry carcass for tilting the poultry carcass from a substantially vertical position to an at least partially horizontal position.

14. The joint cutting apparatus according to claim 1, further comprising a collector for receiving a separated carcass part comprising one of the first or second bone, and configured to receive quality information regarding the separated carcass part, and configured to classify the separated carcass part based on quality information.

15. A method for making a cut in leg or wing of a poultry carcass, the leg or wing comprising at least a joint connecting a first bone and a second bone and joint tissue surrounding the joint, the method comprising:
    moving the poultry carcass in a transport direction; and
    making the cut using a joint cutting apparatus according to claim 1.

\* \* \* \* \*